Figure 1:
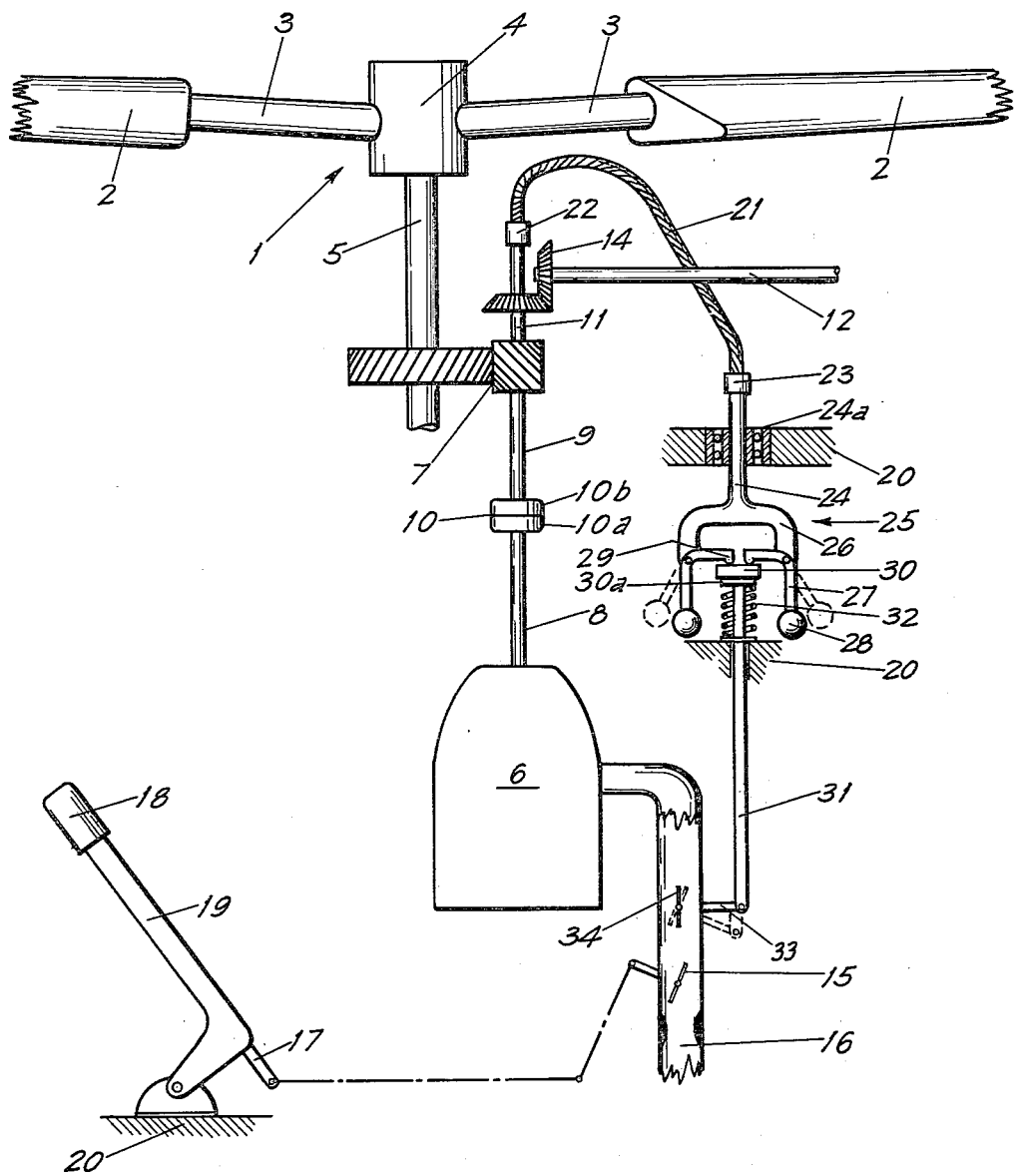

Aug. 14, 1962  J. B. NICHOLS ETAL  3,049,178
HELICOPTER GOVERNOR
Filed July 20, 1959

INVENTORS.
JOHN B. NICHOLS
JOSEPH STUART III
ATTORNEYS

United States Patent Office 3,049,178
Patented Aug. 14, 1962

3,049,178
HELICOPTER GOVERNOR
John B. Nichols, Atherton, and Joseph Stuart III, Palo Alto, Calif., assignors, by mesne assignments, to Hiller Aircraft Corp., Palo Alto, Calif., a corporation of California
Filed July 20, 1959, Ser. No. 828,364
6 Claims. (Cl. 170—135.7)

This invention relates to helicopter governors and, more particularly, to a governor adapted to reflect and control the actual rotor speed output measured directly at the rotor shaft.

In most present day helicopters the engine power is controlled manually by the pilot and considerable manipulation is often necessary to control the engine power delivered so as to maintain a desired fixed rotational speed of the main rotor. Many previous efforts to govern helicopter rotor speeds have been directed toward the source, i.e., the engine. Such governors are generally satisfactory but they usually require complex and elaborate stabilizing mechanisms because of the low fly-wheel inertia of the engine, particularly when it is disengaged from the main rotor. Governors were also distinguished by the manner in which they controlled speed. For example, some systems operated to vary the rotor pitch in response to speed changes, but such systems required rather high-powered, complex governors to achieve the necessary work. Other governors actuated suitable linkages to operate the conventional throttle butterfly valve, but such linkages were necessarily extremely complicated in order to enable either independent or simultaneous operation of the butterfly valve by the pilot or the governor without materially affecting the operation of the other.

It is, therefore, an object of this invention to provide a governor driven directly from the main rotor shaft to operate a throttle valve without affecting, in any way, the pilot's operation of the throttle control.

It is a further object of this invention to provide a governor control driven from the main rotor shaft to operate a separate throttling butterfly valve by simple mechanical linkage.

It is a further object of this invention to provide a governor control which is readily adaptable to existing helicopters and which is simple and reliable in operation.

In carrying out this invention, there is provided a governor operated directly from the main rotor shaft to take advantage of the high inertia of the rotor blades so that the operation of the governor will be determined by the true output of the rotor shaft. In the gas-air intake passage of the conventional internal combustion engine, wherein the butterfly throttle valve is situated, there is provided a separate butterfly valve independently operated through simple linkage by the governor control in response to speed variations without disturbing the throttle setting imposed by the pilot. That is, overspeed of the rotor will cause a modification of the throttle operation without pilot manipulation.

Other objects and advantages of this invention will become apparent from the specification following when read in connection with the accompanying drawing wherein:

FIG. 1 is a schematic view of the driving mechanism of a conventional helicopter.

In the drawing the main rotor assembly is shown generally at 1 and includes rotor blades 2 carried on spars 3, supported in a central hub 4 mounted on the upright main rotor drive shaft or mast 5. The main shaft 5 is driven by an internal combustion engine 6 through the medium of reduction gears 7. The engine output shaft 8 is connected to the reduction gear input shaft 9 through a free-wheeling unit 10 having input and output one-way clutch elements 10a and 10b which permit autorotation of the main rotor.

Also driven from the reduction gear is a shaft 11 for driving the tail rotor shaft 12 through bevel gears 14.

The power delivered by the reciprocating engine 6 is controlled as usual by means of a butterfly valve 15 pivotable in the air-gas inlet conduit 16. The butterfly valve 15 is operated through an appropriate linkage 17 by means of the twist grip 18 provided on the collective pitch control lever 19 which is pivoted on the helicopter frame 20.

All of the mechanisms and elements discussed up to this point are conventional and variations therein and departures therefrom may be made within the scope of this invention. The apparatus has been described merely for purposes of illustration and to show the environment in which the instant invention is to be employed.

Driven by any suitable member rotating in synchronism with the main rotor shaft 5 is a flexible shaft 21 shown here coupled at one end 22 to the reduction gear output shaft 11 for the tail rotor and at the other end 23 to the input shaft 24 of a governor 25 journaled at 24a in the frame 20. Of course, any suitable gearing or other drive transmission mechanism may be used to drive the governor shaft 24, as long as the connection is made to an element on the output side 10b of the free wheeling unit 10 so as to rotate at the relatively stable rate of the high inertia main rotor. The governor may be of any construction capable of delivering linear motion in response to speed changes and, for example, may comprise simply a yoke 26 to each arm of which is pivoted a bell crank lever 27 carrying a weight 28 on one arm and low-friction contact members 29 on the other arm. The contact members of the bell crank lever may engage a collar 30 on a rod 31 slidable in the frame 20 and constantly urged upwardly by a spring 32. The rod 31 is pivotally linked at its lower end to the control lever arm 33 of a second butterfly valve 34 so that as the weights 28 swing outwardly speed control butterfly valve moves toward a throttling position across the conduit 16 as indicated in phantom lines in the drawing. It is to be understood that any suitable means such as an adjustment nut 30a may be provided to vary the force of the spring 32 and thus effect the initial setting of the governor 25 according to a desired speed level.

Since the governor 25 is driven by an element on the output side of the free wheeling unit, its rate of rotation will always be in direct ratio to the speed of the main rotor 1. The high inertia of the relatively long rotor blades 2 tends to stabilize the speed of rotation of the main drive shaft 5 and permits the use of a simple governor without speed stabilizer. The throttling action introduced by governor overspeed is entirely independent of the pilot imposed throttle setting so that no compensating linkages are required to effect operation of both controls simultaneously. In the event of governor failure the spring 32 will force the rod 31 upwardly to maintain the second butterfly valve 34 in open condition. Consequently, the action of the pilot controlled valve 15 will be unaffected and unmodified.

While a preferred embodiment of this invention has been shown for purposes of illustration, it is to be understood that modifications and changes may be made therein without departing from the spirit and scope of this invention which is defined in the claims appended hereto.

What is claimed as invention is:

1. In a helicopter including a main rotor, an internal combustion engine for driving said rotor, drive means including a free wheeling unit for driving said rotor from said engine, an air-gas intake conduit for said engine, a throttle valve in said conduit, and pilot controlled means for operating said throttle valve, the combination therewith of a governor mechanically connected to said rotor on the output side of said free wheeling unit to be rotated in synchronism therewith and including a control member movable in response to excessive speed of said rotor, a second throttle valve in said air-gas intake conduit, means connecting said second throttle valve to said control member for movement therewith toward a closed position in said intake conduit as said governor reflects excessive speed of said rotor, and means normally biasing said second throttle valve to a fully open position.

2. In a helicopter including a main rotor, an upright main shaft supporting said rotor for rotation therewith, an internal combustion engine, drive means including a free-wheeling unit for driving said main shaft from said engine, an air-gas intake conduit for said engine, a throttle valve in said conduit, and pilot control means for operating said pilot valve, the combination therewith of a governor directly driven by an element of said drive means and said main shaft on the output side of said free-wheeling unit, said governor including a control member movable in response to excessive speed of said element, a second separate throttle valve in said air-gas intake conduit, and linkage means connecting said second throttle valve to said control member for movement therewith toward a closed position in said intake conduit as said governor reflects excessive speed of said rotor.

3. The combination defined in claim 2 including resilient means biasing said linkage means in opposition to said governor to move said second throttle valve to a fully open position at any speed of said governor slower than a predetermined minimum speed.

4. The combination with a helicopter having a main rotor supported for rotation about an upright axis, drive means for said main rotor comprising an internal combustion engine having an air-gas intake conduit provided with a throttle control valve therein, and a free wheeling unit interposed in said drive means; means for automatically controlling the rotor speed comprising governing mechanism connected to said throttle control valve and to said drive means at the output side of said free wheeling unit whereby the governor mechanism and said valve are directly responsive to the speed of the main rotor to utilize the relatively high inertia of such main rotor.

5. The combination of claim 4 wherein a flexible shaft connects the governing mechanism to the output side of said free wheeling unit.

6. The combination of claim 4 having another throttle control valve in said air-gas intake conduit, and pilot controllable means connected to said latter valve.

References Cited in the file of this patent
UNITED STATES PATENTS

| | | |
|---|---|---|
| 1,230,337 | Stoffel | June 19, 1917 |
| 2,000,997 | Sharpe | May 14, 1935 |
| 2,001,590 | Spiller | May 14, 1935 |
| 2,077,555 | Frantz | Apr. 20, 1937 |
| 2,134,660 | Everts | Oct. 25, 1938 |
| 2,481,746 | Hiller | Sept. 13, 1949 |
| 2,517,150 | Webb | Aug. 1, 1950 |